United States Patent [19]
Jones

[11] 3,765,549
[45] Oct. 16, 1973

[54] APPARATUS AND METHOD FOR LOADING NUCLEAR FUEL INTO A SHIPPING CASK WITHOUT IMMERSION IN A POOL

[75] Inventor: Cecil R. Jones, Milford, Conn.
[73] Assignee: Transfer Systems Incorporated, New Haven, Conn.
[22] Filed: Oct. 21, 1971
[21] Appl. No.: 191,247

[52] U.S. Cl. ............... 214/18 N, 214/41, 214/152, 176/30
[51] Int. Cl. ............................................ B66c 17/00
[58] Field of Search .......................... 214/18 N, 41; 176/28, 29, 30, 31, 32

[56] References Cited
UNITED STATES PATENTS
3,183,162  5/1965  Chemin et al. ............... 214/18 N
3,141,685  7/1964  Watts ............................. 277/2

FOREIGN PATENTS OR APPLICATIONS
194,079  3/1923  Great Britain ..................... 214/41

Primary Examiner—Robert G. Sheridan
Assistant Examiner—Kenneth Noland
Attorney—Jack Oisher

[57] ABSTRACT

Apparatus and a method for loading nuclear fuel into a dry shipping cask is described. It is characterized by introduction of the transport vehicle carrying the shipping cask into the reactor building below an auxiliary pool connected to the fuel storage pool. The cask is elevated to an upright position and its open end sealed to the auxiliary pool walls to constitute in effect the pool bottom. Novel cask elevating and cask and vehicle locking means are described. A novel double seal providing leakage detection is also described.

15 Claims, 2 Drawing Figures

APPARATUS AND METHOD FOR LOADING NUCLEAR FUEL INTO A SHIPPING CASK WITHOUT IMMERSION IN A POOL

This invention related to apparatus and a method for loading nuclear fuel into a shipping cask to be provided on a transport vehicle for transport between a power generating reactor installation and a fuel reprocessing plant.

The fuel elements commonly employed in BWRs or PWRs comprise a fuel assembly unit containing a plurality of long thin fuel rods. The fuel rods comprise a plurality of radio-active uranium compound pellets packed within a steel tube clad with zirconium or a zirconium alloy. The fuel elements become spent requiring replacement and reprocessing when their tubing springs a leak or their activity falls below a desired level.

In the current practice, the fuel assembly to be replaced and reprocessed is lifted out of the reactor core and moved through a connecting channel into an adjacent storage pool. Next, a suitable shipping cask, usually made of lead or other good shielding material, is removed from its transport vehicle stationed outside the reactor building, lifted to the top floor of the reactor building, then carried across the top floor and lowered into the fuel storage pool, the fuel assembly loaded into the cask, the cask sealed, lifted out of the storage pool to the top floor, decontaminated, carried across the top floor and then lowered to the transport vehicle and there secured for conveyance to the reprocessing plant.

At the reprocessing plant, a similar cask transport process is carried out before the fuel rods can be separated from the assembly and taken apart, the radiated pellets removed, the uranium separated from their fission products and prepared for repacking into new tubing.

As is known, the fuel storage pool and similar fuel processing pools contain contaminated water due among other things to leaking fuel rods, despite constant filtration. Normally such water is cycled and the minimum amount possible allowed to escape, because radioactive water is hazardous and most difficult to handle. However, the flushing water that is used to decontaminate the cask, due to immersion in the storage pool, cannot be reprocessed because it contains a large number of different types of materials that are extremely difficult to handle, such as oil, dust particles, and paint scale, and it is not practical to reprocess this water to restore the extremely high purity normally used at reactor stations.

The situation is further aggravated at the reprocessing plant, because the process there involved is extremely radioactive and the potential for contamination of the water and thus the immersed cask is much greater than for the usual power station.

Moreover, contaminated water pools cause contamination of overhead cranes, sheaves and cables used for hoisting elements in and out of the pool. Decontamination of such equipment is extremely burdensome.

Thus there is a need in the art for a cask handling process that would avoid exposure of the cask exterior to possibly contaminated pool water.

In my prior copending application, Ser. No. 179,713 filed Sept. 13, 1971, I describe and claim an improved cask-handling process for an existing or already designed plant employing a flexible shroud which is provided to enclose the cask exterior and prevent contact with the storage pool water when the cask is immersed to receive the spent fuel.

SUMMARY OF THE INVENTION

The present invention is directed to a novel installation and method providing for loading of nuclear fuel into a shipping cask but without immersion of the cask into a pool. This is achieved by in effect making the cask the bottom of an auxiliary pool connected by way of a controlled passageway or channel to the fuel storage, handling or reprocessing pool. Another feature of the invention is not to remove the cask from its transport vehicle, but to introduce the transport vehicle with attached cask into the reactor or reprocessing building below the auxiliary pool. Still another feature is a cask elevating and locking system that will prevent cask tipping or vehicle movement. A further feature is a double sealing system of the cask to the auxiliary pool providing increased safety against leakage and early detection of leakage permitting rapid interruption of the loading process.

These and further features and advantages of the invention will best be understood from the following detailed description of an exemplary embodiment thereof taken in conjunction with the accompanying drawings wherein:

DESCRIPTION OF PREFERRED EMBODIMENT

Figure 1:
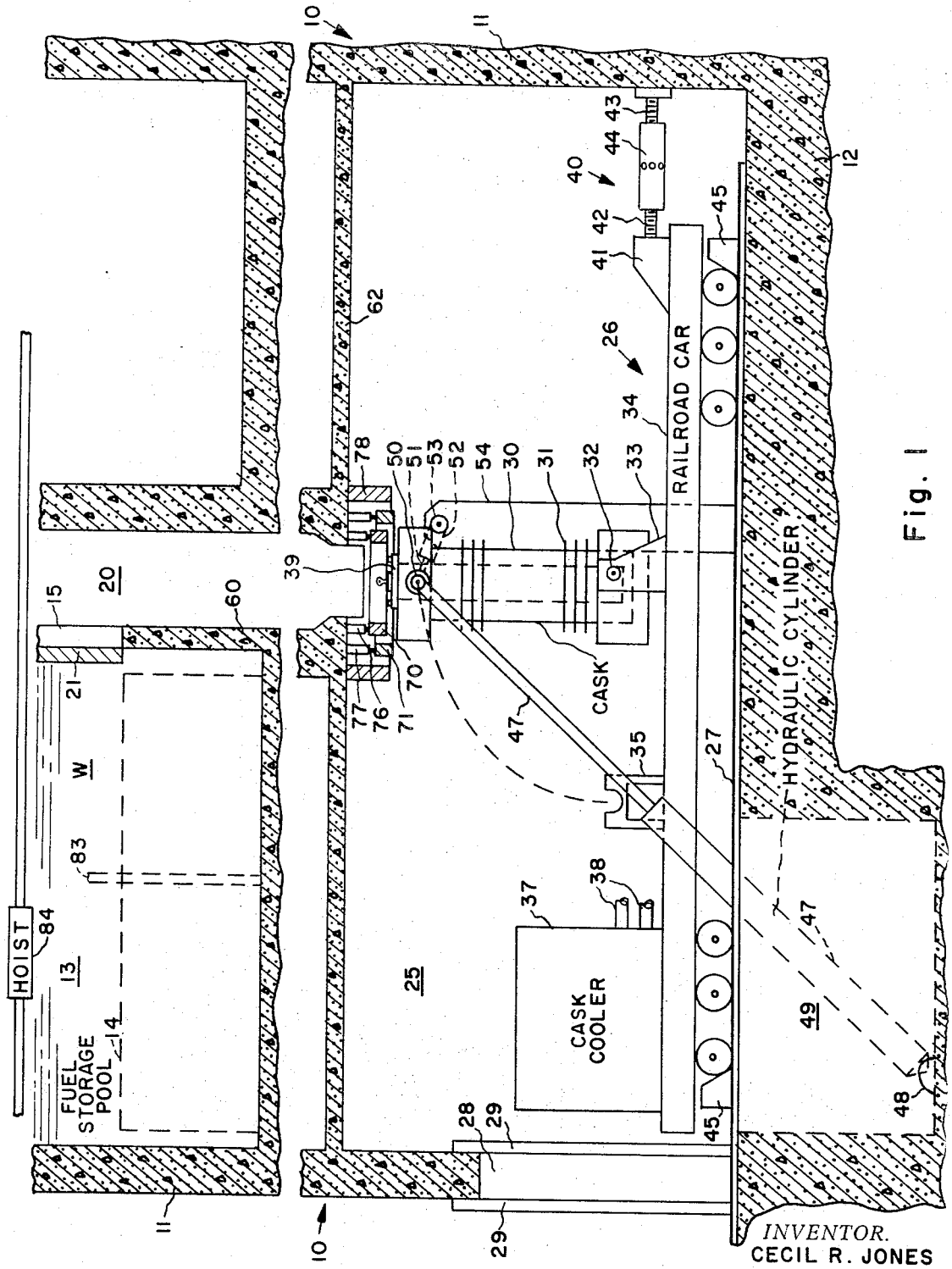
FIG. 1 is a partial cross-sectional view of my novel nuclearn reactor generating installation showing the location of the fuel storage pool and the cask-handling equipment.

FIG. 1 is an elevational partly cross-sectional view of a building for handling or reprocessing fuel for nuclear reactors. It can also be the actual reactor building, as will be later explained. It comprises a building 10 having shielding exterior walls 11, for example of concrete, and a lower floor 12. The building is divided into a number of compartments or wells by interior walls. One such well 13 is located in an upper part of the building and contains a pool of water for shielding purposes. In a reactor installation, this would be the fuel storage pool where new fuel is stored in a storage rack 14 for use as replacements for spent fuel in a nuclear reactor, and where the spent fuel is stored prior to loading in a cask for transport to a fuel reprocessing plant. In the reactor installation, another well (not shown) would be present for the reactor itself. That well would be connected by a suitable canal (not shown) to the fuel storage well 13 to permit transfer of fuel assemblies between the two without removal from the shielding and cooling water W.

In a reprocessing plant, the well 13 could represent the pool wherein the spent fuel elements are disassembled and new fuel elements constructed.

The well 13 is connected by way of a transfer canal or channel 15 in a side wall to a cylindrical auxiliary well 20, which becomes an auxiliary pool when filled with water. A suitable door 21 similar to the one currently used for connecting the fuel pool canal to the reactor well is provided for closing off the transfer canal 15 in a water-tight manner. The door may be remotely activated to open up or close off the transfer canal by means well known in the art.

The auxiliary well 20 extends from the level of storage well 13 vertically down through the building where its bottom, which is open, terminates in a vehicle receiving area 25 which extends under the auxiliary well at a level below the storage pool 13. The vehicle receiving area 25 is large enough to accommodate a conventional transport vehicle 26 for the shipping cask. For example, the vehicle 26 may be a railroad car which rides on rails 27 which run along the floor 12 of the vehicle receiving area 25 and through a door opening 28 in the exterior building wall 11 to the outside. The door opening 28 may be closed off by double shielding doors 29 providing a reasonably sealed receiving area 25 in case of an accident occurring during loading or unloading of the fuel.

The transport vehicle 26 has a shipping cask 30 permanently secured to it. In the form shown, the shipping cask 30 comprises an elongated hollow cylinder of lead or other radiation shielding material provided with radiating or cooling fins 31 on its exterior walls. The bottom end of the cask is pivotably mounted 32 on a support 33 secured to the vehicle bed 34. A second support 35 is also mounted on the vehicle bed 34 in a position to receive projections on the top end of the cask when it is pivoted to a horizontal position as shown by the phantom arc in FIG. 1. In the horizontal position, which is the position occupied by the cask during transport, means 37 are provided for circulating cooling water through the cask to keep any fuel assemblies loaded therein from overheating. The cooling water is carried to and from the cooler 37 by flexible couplings 38 connected to the cask interior via couplings (not shown) to the cask body 30. The transport vehicle and vehicle receiving area are provided with means for locating the cask when elevated directly underneath the auxiliary well 20. The cask locating means in the illustrative embodiment takes the form of a projecting device 40 mounted 41 on the forward end of the vehicle bed 34 and dimensioned so as to stop the incoming vehicle when the cask occupies the desired position. As shown, the device 40 may comprise a screw 42 secured to the vehicle mount 41 and a similar screw 43 secured to the wall 11 with a turnbuckle 44 provided to adjustably secure the device 40 to assist in locking the position of the vehicle. Wheel brakes (not shown) on the vehicle may also be activated, and suitable wheel blocks 45 also installed to assist in locking the vehicle.

Means are provided in the vehicle receiving area to elevate the cask to an upright position and lock the cask in the upright position. In the preferred embodiment, the cask elevating means comprises a hydraulic cylinder 47 whose cylinder end is secured by way of a pivot 48 in a well 49 in the building floor 12. The piston end 47 is removably coupled to the cask projections or trunnions 50 at its upper end. Also removably secured to the upper cask projections 50 is the piston 51 of a small adjusting hydraulic cylinder 52 whose cylinder is pivotably secured 53 to a supporting member 54 mounted on the floor 12. As an alternative, the hydraulic cylinder 52 may be an adjustable turnbuckle arrangement as shown at 40, and in addition to locking the cask in its elevated position is also used as a fine adjustment to align the cask with the auxiliary well bottom.

Figure 2:
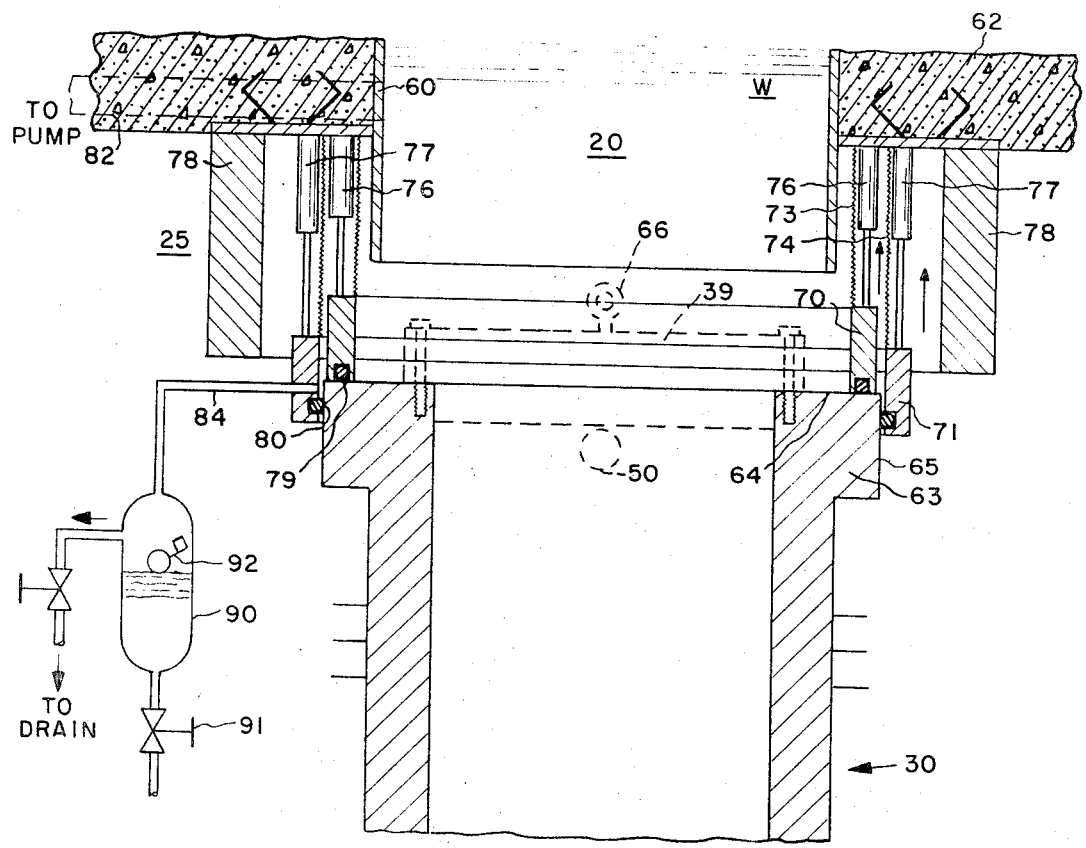
FIG. 2 is a cross-sectional detail view showing the sealing of the cask end to the auxiliary pool bottom.

After the transport vehicle 26 with horizontal cask 30 has been moved into the receiving area 25 and locked into position, and the piston end 47 connected to the trunnions 50, the hydraulic cylinder 47 is activated raising the cask 30 to the elevated position shown. Then the piston of the small cylinder 52 is secured to the trunnions and the cask finely adjusted into the desired position by activation of the small hydraulic cylinder 52 and then the latter locked into position to lock the cask into its upright position. Then means are provided to seal the cask to the auxiliary well bottom in a fluid tight manner. Preferably, the auxiliary well 20 is tapered at its bottom to help guide the descending fuel elements, and is provided with a solid stainless steel liner 60 (see FIG. 2) which depends below the ceiling 62 of the vehicle receiving area 25. For sealing purposes, the cask 30 has an upper shoulder portion 63 whose top 64 and side annular surfaces 65 are precision machined to form sealing surfaces. The usual cask lid 39 is bolted to the cask shoulder, and contains means such as eye bolt 66 for lifting same.

One suitable form of cask sealing means comprises two independent sealing members 70, 71 which are brought into fluid sealing engagement with the top and side surfaces 64, 65, respectively, of the cask shoulder 63. The sealing members comprise an inner annular sealing member 70 secured by inner annular flexible bellows 73 to the wall portion 62 surrounding the auxiliary well 20, and an outer annular sealing member 71 secured by outer annular flexible bellows 74 to the wall portion 62 surrounding the auxiliary well 20. Inner sealing member 70 is actuated by one or more hydraulic cylinders 76, and outer sealing member 71 is actuated by one or more hydraulic cylinders 77.

The hydraulic cylinders 76, 77 have their cylinder ends secured to a heavy steel plate mounted on the wall 62 and their pistons secured to their respective sealing members.

The sealing assembly is surrounded by a shielding structure comprising an outer fixed cylindrical radiation shield 78 secured to the plate on the wall 62. The sealing members 70, 71 themselves are also constructed of suitable radiation shielding material. At the bottom end of inner sealing member 70 is a groove housing an annular seal 79, and the inner wall of outer sealing member 71 also has a groove housing an annular seal 80. Both seals 79, 80 may be, for example, O-rings of suitable elastomeric material.

After the cask has been elevated into its vertical position, a suitable tool (not shown) is inserted through the auxiliary well 20 and the cask lid 39 unbolted and removed by lifting out via the well 20. Then the hydraulic cylinders 76, 77 are actuated moving the sealing members 70, 71 vertically downward into sealing engagement with the cask shoulder 63. As shown, the seal 79 in the sealing member 70 engages the top sealing surface 64 of the cask surrounding the lid 39, and the seal 80 in the sealing member 71 engages the side sealing surface 65 of the cask. This results in the cask being water-tight sealed to the bottom of the auxiliary well 20 by two independent seals. Then the well 20 is filled with water to the level of the storage pool 13 through a combined wide bore inlet-outlet 82 connected to an external pumping system. The latter may be part of the fuel pool cooling and filtering system, which has appropriate pumps, heat-exchanger and filters. Next, the door 21 closing off the fuel transfer canal 15 to the storage pool is opened, allowing passage of fuel elements 83 by means of the usual refueling bridge and attached hoists 84 (shown schematically) located over the storage pool and auxiliary pool 20. For instance, a fuel assembly 83 stored in the storage pool is lifted by the hoist, carried through the canal 15 into the auxiliary pool 20 and then lowered past the seal directly into the water filled cask 30, which remains connected to its cooling system 37. After the fuel has been installed in the cask, the door 21 is shut. The cask lid 39 is lowered through the auxiliary pool and using a special tool (not shown) bolted to the cask sealing same. Then, the auxiliary pool is drained of water by pumping out via conduit 82, the inner set of hydraulic cylinders 76 is actuated to lift sealing member 70, any remaining water drained off through a small bore flexible conduit 84 extending through the outer sealing member 71, and the outer set of hydraulic cylinders 77 actuated to lift sealing member 77. Final torque of the lid bolts are then checked. Finally, the piston 52 is removed from the trunnions 50, the filled cask 30 is pivoted to its horizontal position, the piston 47 removed, the lid 39 and small area at the top of the cask exposed to the water decontaminated if necessary, the vehicle 26 released, and the sealing doors 29 may be opened and the vehicle transported to for example the fuel reprocessing plant.

In order to provide additional protection against leakage, moisture or leak detection means may be coupled to the conduit 84 terminating in the space between the sealing members 70, 71. A preferred form as shown comprises a tank 90 with a bottom drain valve 91 housing a well-known float-switch assembly 92 to indicate the water level in the tank. When the water level in the tank rises above a preset level, an alarm may be sounded. Fuel transfer is not started unless there is no indication of leakage at the seal 70. If a leak does develop, the water level can still be maintained by the fuel pool cooling system while the fuel is removed from the cask to the fuel pool as quickly as possible. Appropriate drains (not shown) may be located in the receiving area 25 to collect leaking water for transfer to the usual radioactive waste tanks in the radwater building.

The fuel assemblies pass through the well 20 into the cask 30, and the sealing system described provides for adequate radiation shielding of these highly radioactive units in the transition area between the well and the cask. This is accomplished by the fixed shield 78 and the movable shields 71, 72, which are positioned such that at least one full thickness of at least one of these shields is always positioned between the fuel elements as they pass from the cask 30 to the well 20, or vice-versa, and the interior of the receiving area 25. While within the cask or well, adequate shielding is provided by the cask and well walls, respectively.

The fixed shield 78 and the retracted movable shields 70, 71 are arranged to be outside the pivoting path of the sealed cask 30. The movable combined shield-sealing members 70, 71 are also adapted to seal to casks of varying heights.

While the inventive construction has been illustrated in connection with a reactor station, application of the same principles make it evident that it can also by employed at the reprocessing plant, wherein casks to be loaded or unloaded with fuel elements have to be handled. Especially is the inventive construction useful at the fuel reprocessing end because the fuel storage or reprocessing pools there are usually more strongly contaminated, and a greater need exists for preventing contact of the cask exterior surfaces with such water. In the inventive construction described herein, only part of the top surface of the cask, whose surface area is relatively small, is in contact with the pool water. The rest of the cask remains dry at all times during loading or unloading of fuel. Another important advantage is elimination of the need to transport the cask via a hoist or the like. These casks can weigh of the order of 100 tons, and in the prior methods, should a hoist cable fail while the cask is being lifted to the refuelling floor or in and out of the pool, a falling cask of this weight could cause catastrophic results. In the method of the invention, the cask is never lifted off the transport vehicle. Any mishaps that may occur, which are easily protected against by providing redundant cask supports on the vehicle itself, are confined to the receiving area 25, well away from any critical equipment in the reactor station or reprocessing plant. Further, personnel access to area 25 may be controlled by designating same as a high radiation area, further minimizing the possibility of accidents.

The water level in the cask can be controlled by means of the drain (not shown) usually provided at the cask bottom. The level can be indicated by a conventional water level indicator, or by introducing a radiation ddtector down the auxiliary well and measuring the radiation from the fuel elements in the cask as attenutated by the water level above it. One of the advantages of the invention is that, since the cask is not removed from the vehicle, it can remain permanently connected to its own cooling system 37 providing independent cooling of the cask water continuously. It will of course also be evident that the same process as described above, but reversed is employed when fuel elements are to be unloaded from the cask and hoisted via the auxiliary pool into the fuel storage pool.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A facility for loading or unloading radioactive nuclear fuel elements into a shielded shipping cask for transport to another location, comprising a structure having an upper level and a lower level, a fuel receiving area at said upper level, an auxiliary well extending vertically through the structure from the upper level to the lower level, a cask receiving area at said lower level and below said auxiliary well, means within the lower level for sealing an open end of the cask to the bottom of the auxiliary well, means for introducing fluid into the auxiliary well and into the cask coupled thereto, means for transferring fuel between the fuel receiving area at the upper level and the cask at the lower level by passage through said fluid-filled auxiliary well, and means for removing the fluid from the auxiliary well.

2. A facility as set forth in claim 1 wherein the cask receiving area is large enough to accommodate a transport vehicle for the cask, the cask is mounted on the transport vehicle, and means are provided to locate the transport vehicle such that the cask open end when positioned vertically is directly under the auxiliary well bottom.

3. A facility as set forth in claim 2 wherein the cask is mounted on the transport vehicle in a horizontal position, and means are provided for elevating the cask while on the transport vehicle into a vertical position.

4. A facility as set forth in claim 1 wherein the sealing means are mounted within the cask receiving area and above the cask, and means are provided for moving the sealing means from a retracted position spaced from the cask to an extended position wherein the sealing means sealingly engage the cask.

5. A facility as set forth in claim 4 wherein the sealing means comprise inner and outer annular sealing members each independently movable into independent sealing engagement with the cask open end.

6. A facility as set forth in claim 5 and further comprising means for detecting fluid leakage into the space between the inner and outer sealing members.

7. A facility as set forth in claim 5 and further comprising radiation shielding means surrounding the sealing means and the open end of the cask when in an upright position.

8. A facility as set forth in claim 7 wherein the cask has at its open end a shoulder providing plural sealing surfaces, the inner and outer sealing members are positioned to engage different portions of the sealing surfaces, and the inner and outer sealing members comprise terminal portions of radiation shielding material connected to flexible bellows members.

9. A method of loading and unloading nuclear fuel elements from a shipping cask, comprising providing a facility having a fluid filled pool at an upper level for storing fuel elements and a cask-receiving area at a lower level with an auxiliary well controllably connected to the pool at its upper end and having an open bottom end, bringing the cask into the cask-receiving area, fluid sealing an open end of the cask to the bottom of the auxiliary well, filling the auxiliary well and cask with fluid, opening the connection between the auxiliary well and the pool, and transporting fuel elements from the pool into the cask via the open connection and the auxiliary well.

10. A method as set forth in claim 9 wherein the cask is on a transport vehicle in a horizontal position, the transport vehicle with mounted cask is brought into the cask-receiving area, the transport vehicle is located relative to the auxiliary well and locked in position, the cask is elevated while on the transport vehicle and the end to be opened aligned with the auxiliary well bottom, after the fuel element transporting step the cask is sealed and the fluid in the auxiliary well is removed, and thereafter the cask is lowered onto the transport vehicle into its horizontal postion.

11. A facility for loading or unloading radio-active nuclear fuel elements into a shipping cask for transport to another location, comprising a structure having an auxiliary well extending vertically through it from an upper level to a lower level, a cask receiving area at said lower level and below said auxiliary well, means within the lower level for sealing an open end of the cask to the bottom of the auxiliary well, means for introducing fluid into the auxiliary well and into the cask coupled thereto, means for removing the fluid from the auxiliary well, and radiation shielding means surrounding the open end of the cask when sealed to the auxiliary well.

12. A facility as set forth in claim 11 wherein the fluid is a radiation shielding and cooling liquid.

13. A plant facility for handling radioactive nuclear fuel elements, comprising a structure having an upper level containing a fluid pool for receiving the fuel and a lower dry level for receiving a shielded shipping cask for transport of the fuel, means for fixing the position of the cask within the lower dry level, and means for transferring fuel between the fluid pool at the upper level and the fixed cask at the lower dry level without immersing the cask in the pool and without removing the cask from the lower level during transfer of the fuel.

14. A facility as set forth in claim 13 and further including means for shielding the dry lower level interior from radiation from the fuel during transfer between the pool and the cask.

15. A facility for loading or unloading nuclear fuel elements into a shipping cask for transport to another location, comprising a structure having an upper level and a lower level, an auxiliary well extending vertically through the structure from the upper level to the lower level, said upper level comprising a fluid filled pool connected by way of a controlled channel to the upper end of the auxiliary well, a cask receiving area at said lower level and below said auxiliary well, means within the lower level for sealing an open end of the cask to the bottom of the auxiliary well, means for introducing fluid into the auxiliary well and into the cask coupled thereto, means for removing the fluid from the auxiliary well, and means for lifting and transporting nuclear fuel elements between the upper level pool and the cask via the auxiliary well and the controlled channel.

* * * * *